(12) United States Patent
　　　Mallette

(10) Patent No.: US 10,416,535 B2
(45) Date of Patent: Sep. 17, 2019

(54) RETROFITTABLE FLOAT WITH AN UNDERWATER CAMERA ATTACHMENT FOR UNMANNED AERIAL VEHICLES

(71) Applicant: Kermit Mallette, Pensacola, FL (US)

(72) Inventor: Kermit Mallette, Pensacola, FL (US)

( * ) Notice: Subject to any disclaimer, the term of this patent is extended or adjusted under 35 U.S.C. 154(b) by 0 days.

(21) Appl. No.: 16/184,730

(22) Filed: Nov. 8, 2018

(65) Prior Publication Data

US 2019/0137847 A1　　May 9, 2019

Related U.S. Application Data

(60) Provisional application No. 62/583,214, filed on Nov. 8, 2017.

(51) Int. Cl.
　　　*G03B 17/08*　　(2006.01)
　　　*G03B 15/00*　　(2006.01)
　　　*B64C 39/02*　　(2006.01)
　　　*B64C 25/54*　　(2006.01)

(52) U.S. Cl.
　　　CPC ............ *G03B 15/006* (2013.01); *B64C 25/54* (2013.01); *B64C 39/024* (2013.01); *G03B 17/08* (2013.01); *B64C 2201/127* (2013.01)

(58) Field of Classification Search
　　　USPC ...................................................... 396/25, 28
　　　See application file for complete search history.

(56) References Cited

U.S. PATENT DOCUMENTS

| | | | | |
|---|---|---|---|---|
| 2,433,971 | A * | 1/1948 | Adams | B63C 11/48 114/330 |
| 3,261,274 | A * | 7/1966 | Smith | G03B 17/08 37/444 |
| 6,056,237 | A * | 5/2000 | Woodland | B64C 3/40 244/3.15 |
| 6,061,522 | A * | 5/2000 | Inoue | G03B 15/05 396/25 |
| 7,007,625 | B2 * | 3/2006 | Shelton | B63G 8/001 114/312 |
| 7,279,675 | B2 * | 10/2007 | Cohen | G02B 23/08 250/216 |
| 2008/0088842 | A1 * | 4/2008 | Schultz | G01J 4/04 356/367 |

(Continued)

*Primary Examiner* — Clayton E. LaBalle
*Assistant Examiner* — Warren K Fenwick

(57) ABSTRACT

A retrofittable float with an underwater camera attachment for unmanned aerial vehicles allows an unmanned aerial vehicle (UAV) to traverse over a body of water while recording images and/or video of the underwater environment. The retrofittable float with an underwater camera attachment includes a flotation device, a plurality of mounting brackets, an underwater scope, and at least one underwater illumination light. The flotation device attaches to the UAV via the plurality of mounting brackets. The plurality of mounting brackets is configured to align the center of gravity of the UAV with the center of buoyancy of the flotation device, thereby reducing the risk of capsizing. Once securely mounted, the camera of the UAV is positioned pointing into the underwater scope. The underwater scope allows the camera to record images and/or videos of the underwater environment. Finally, the at least one underwater illumination light is used to increase visibility.

11 Claims, 10 Drawing Sheets

(56) References Cited

U.S. PATENT DOCUMENTS

| | | | | |
|---|---|---|---|---|
| 2009/0207066 A1* | 8/2009 | Carcone | ............... | H01Q 1/04 |
| | | | | 342/5 |
| 2012/0134657 A1* | 5/2012 | Louvet | ............... | B63B 22/003 |
| | | | | 396/25 |
| 2016/0376000 A1* | 12/2016 | Kohstall | ............... | B64C 37/00 |
| | | | | 114/313 |
| 2019/0137847 A1* | 5/2019 | Mallette | ............... | G03B 15/006 |

\* cited by examiner

RETROFITTABLE FLOAT WITH AN UNDERWATER CAMERA ATTACHMENT FOR UNMANNED AERIAL VEHICLES

The current application claims a priority to the U.S. Provisional Patent application Ser. No. 62/583,214 filed on Nov. 8, 2017.

FIELD OF THE INVENTION

The present invention generally relates to accessories and attachments for unmanned aerial systems and/or unmanned aerial vehicles. More specifically, a float with an underwater camera attachment enables an unmanned aerial vehicle to traverse over a body of water and take images of the underwater environment.

BACKGROUND OF THE INVENTION

Presently, drones are becoming more noticed by the public. The general public are becoming more aware of drones and other unmanned aerial vehicles. Much of the attention can be attributed to hobbyists who use drone for recreational purposes. Drones, on their own, can be a great source of amusement and education. For instance, drones can be used to study local atmospheric conditions, or to monitor local traffic without the use of helicopter that are often noisy and expensive. Although drones do come with cameras and extended battery life, on their own, most drones do not come with other attachments to make themselves more accessible for other uses. For instance, drones cannot land over water because they do not contain a floatation device similar to pontoons found on seaplanes or amphibious aircrafts. Also, most drones are not capable of performing water-based tasks such as taking underwater photographs.

There are pontoons for drones currently on the market. However, many of these pontoons are not a single float for the drone. Instead, other pontoons are made of at least two separate floats, which causes more instability and imbalance. More importantly, these pontoons do not have any storage capability. Even with the pontoons currently available on the market, most drones cannot take underwater photographs or video because the drone's must be kept suspended over the water to prevent water from damaging the drone's hardware. Consequently, the drone camera cannot see through the surface of the water. Further, although there exists camera lens attachment for use in underwater photography, most are not readily adaptable for drones.

An objective of the present invention is to provide users with a pontoon attachment for drones, an underwater camera attachment for drone cameras, and a storage compartment for carrying a payload over any body of water using the drone. The present invention provides users a pontoon that is more stable and better balanced. The pontoon of the present invention is hollow to allow users to store the items within the pontoon. Also, the pontoon contains an assortment of snaps, slots, and/or clips external to its surface in order attach a wide variety of drones. The present invention also provides a variety of underwater lens attachment that is submerged underwater to allow the drone to record the underwater without exposing the hardware of the drone.

DETAILED DESCRIPTION OF THE INVENTION

All illustrations of the drawings are for the purpose of describing selected versions of the present invention and are not intended to limit the scope of the present invention.

Figure 1:
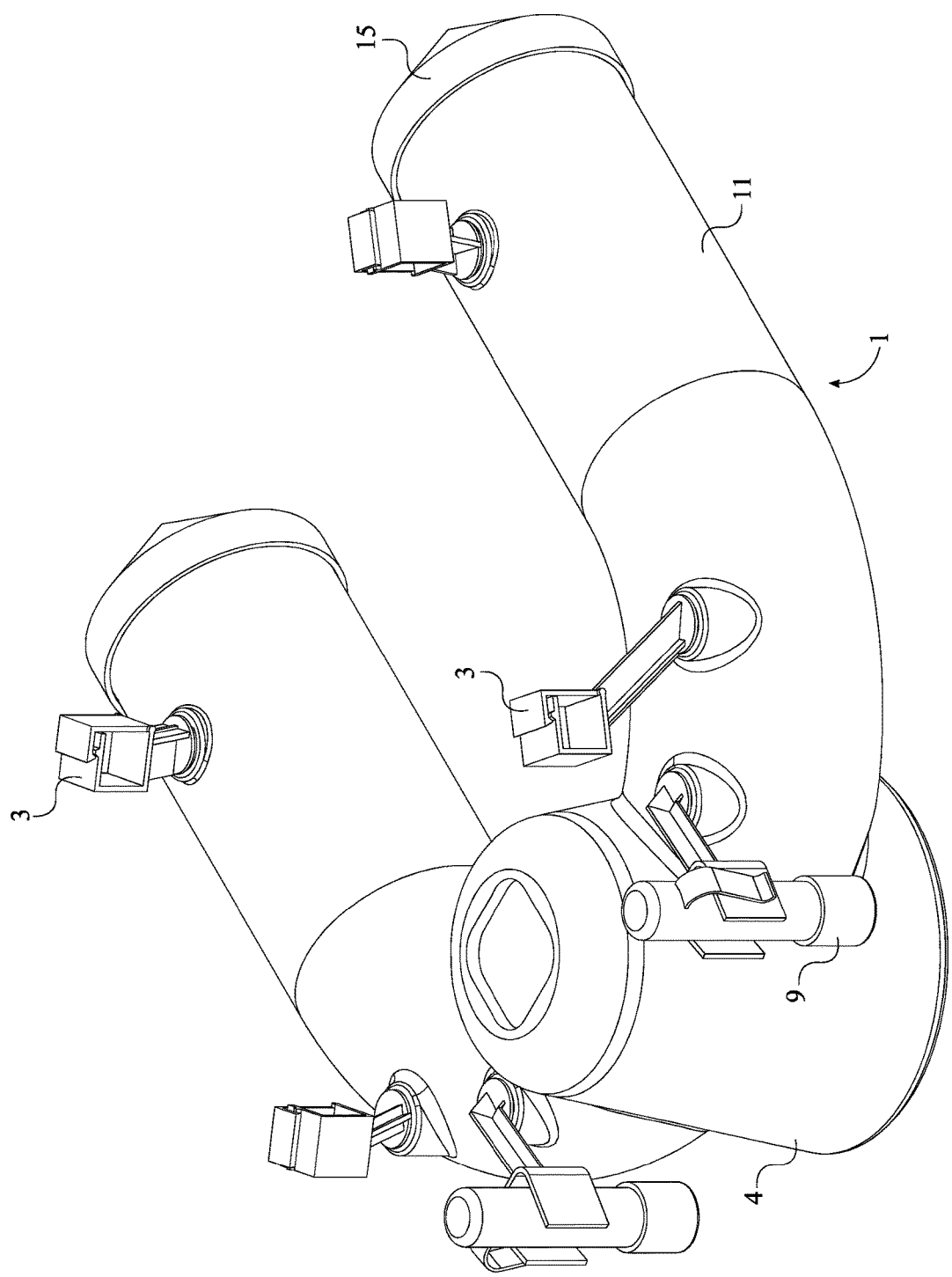
FIG. 1 is a front perspective view of the present invention.

The present invention is a retrofittable float with an underwater camera attachment for unmanned aerial vehicles (UAV). The retrofittable float allows the UAV to traverse over a body of water while recording images or video of the underwater environment. The preferred UAV is a quadcopter drone with a gimballed camera which records images of the underwater environment via the underwater camera attachment. As can be seen in FIG. 1, the preferred embodiment of the present invention comprises a flotation device 1, a plurality of mounting brackets 3, an underwater scope 4, and at least one underwater illumination light 9. The preferred flotation device 1 has a generally tubular shape to generate the required buoyant force. Further, the flotation device 1 is only partially submerged and generally stays above the surface of the water. This creates a large dry area for mounting the UAV and its electrically sensitive components. Furthermore, the preferred flotation device 1 has a recess at the center to allow downward pointing sensors of the UAV to monitor the surface of the water. In one possible embodiment of the flotation device 1, a grasping arm may be provided to grasp or carry an object. More specifically, the grasping arm may be used to suspend an object over the surface of the water.

The UAV is attached to the flotation device 1 by the plurality of mounting brackets 3. In the preferred embodiment, the plurality of mounting brackets 3 is customized to fit specific models of UAVs. This is so that center of gravity of the UAV always aligns with the center of buoyancy of the flotation device 1. If the center of gravity and the center of buoyancy are misaligned, the floatation device can capsize and cause permanent water damage to the UAV. When attached to the flotation device 1, the camera is positioned pointing downwards into the underwater scope 4. The allows the camera to take videos or photos of the underwater environment. The at least one underwater illumination light 9 is provided to illuminate the underwater environment.

Figure 2:
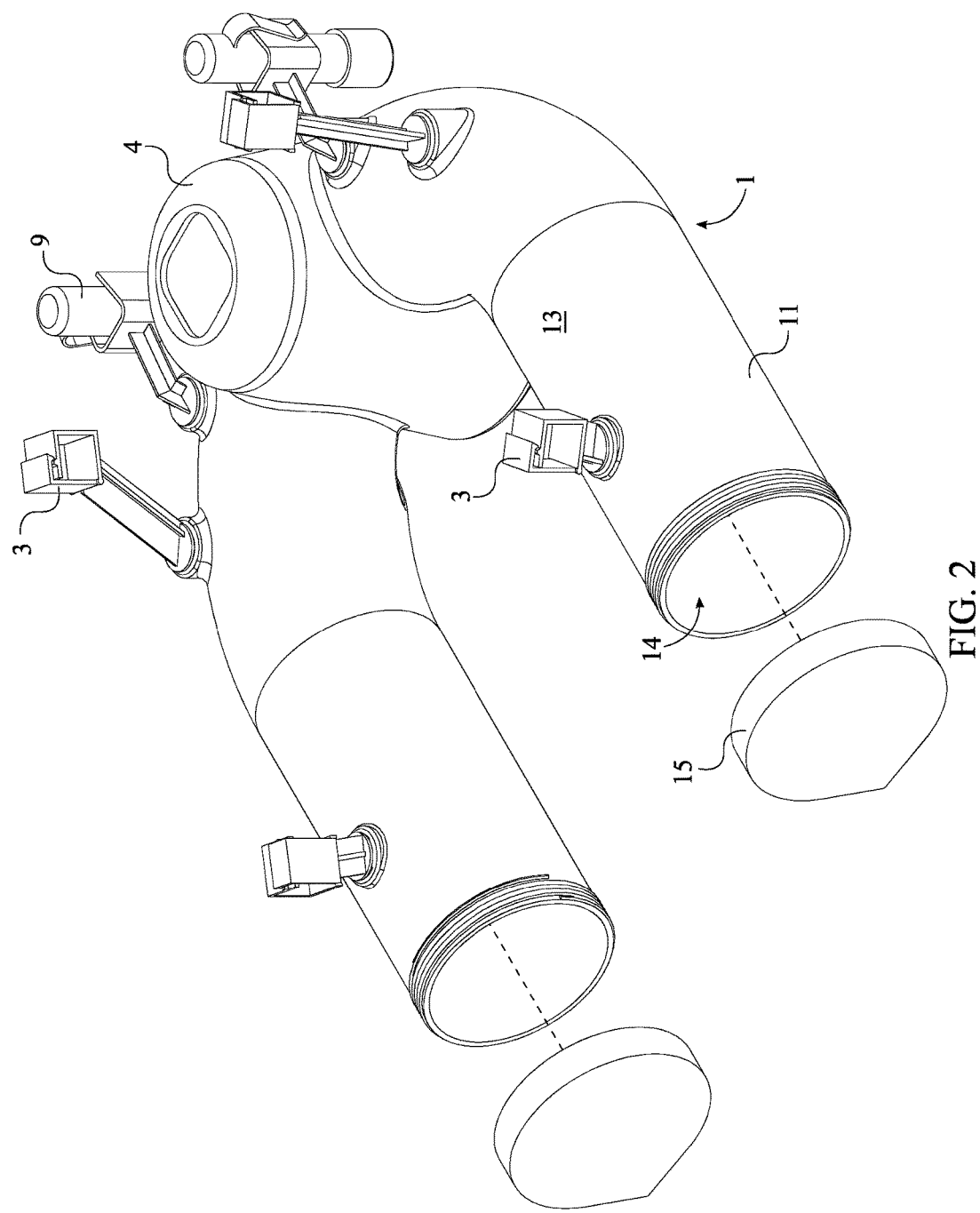
FIG. 2 is a is a rear perspective view illustrating the at least one hatch cover detached from the at least one hatch.
Figure 3:
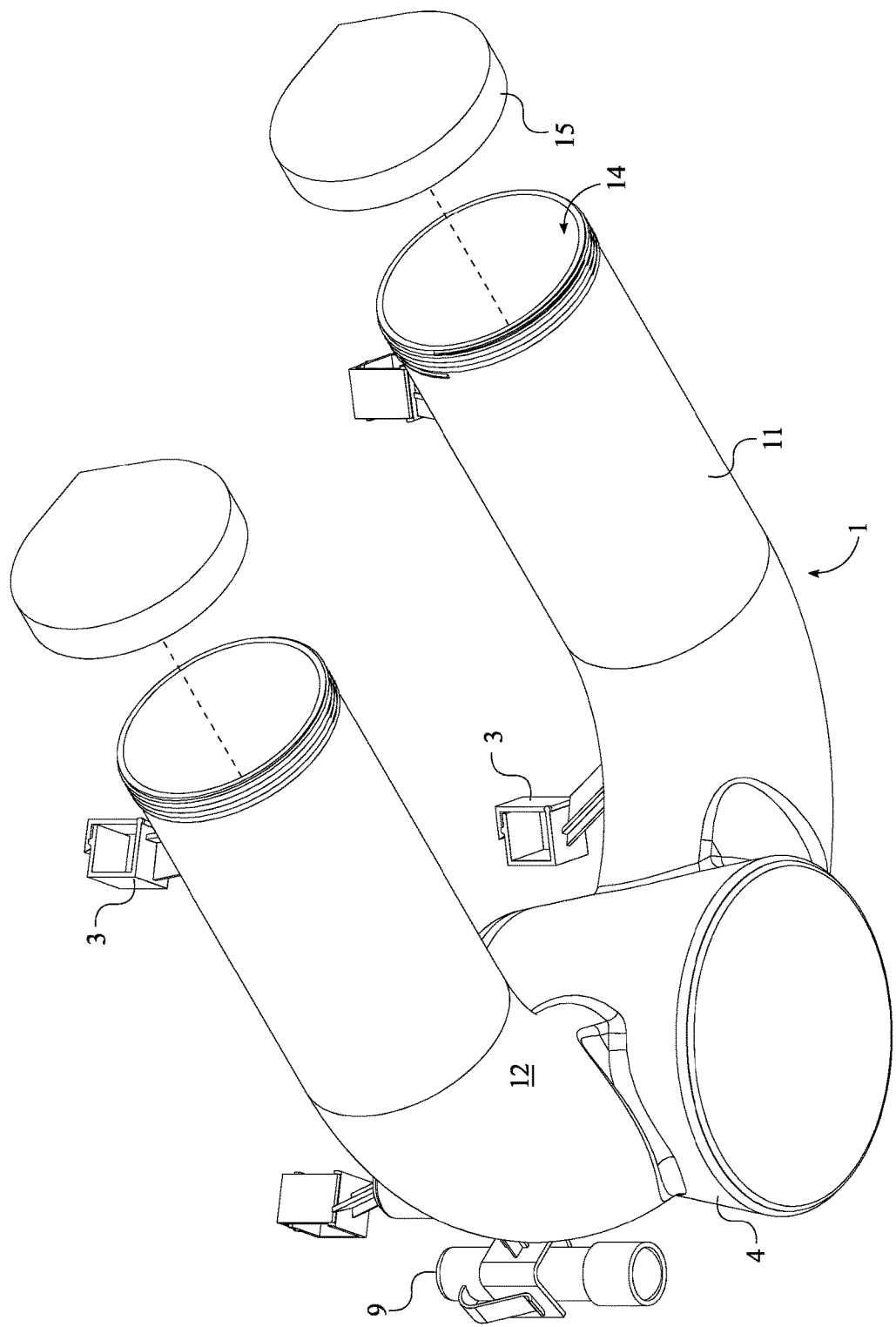
FIG. 3 is a bottom perspective view illustrating the position of the submerged side.

Referring to FIG. 2 and FIG. 3, the flotation device 1 comprises an outer shell 11, a submerged side 12, an exposed side 13, at least one hatch 14, at least one hatch cover 15, and a storage compartment 16. The outer shell 11 is preferably made of buoyant materials such as low-density plastics. The submerged side 12 is defined as the side of the flotation device 1 below the waterline. In contrast, the exposed side 13 is the side that is exposed above the waterline. Accordingly, the submerged side 12 and the exposed side 13 are positioned opposite each other about the outer shell 11. As can be seen more clearly in FIG. 5, the storage compartment 16 is positioned within the outer shell 11. As such, the outer shell 11 prevents water from penetrating into the storage compartment 16 and protects items placed in the storage compartment 16 from water damage. In the preferred implementation, the storage compartment 16 allows the flotation device 1 to store and transport cargo over the water. The at least one hatch 14 and at least one hatch cover 15 are provided to allow selective access into the storage compartment 16. As such, the at least one hatch 14 traverses through the outer shell 11 delineating the storage compartment 16. The at least one hatch cover 15 is attached to the outer shell 11, wherein the at least one hatch cover 15 selectively encloses the at least one hatch 14. In the preferred embodiment, the at least one hatch 14 is a circular threaded opening. Accordingly, the at least one hatch cover 15 is a screw cap that screws onto the threaded opening, thereby creating a water tight seal that keeps the storage compartment 16 dry. Alternately, the at least one hatch 14 may be any shape or size. Similarly, the at least one hatch cover 15 may employ any closure capable of creating a water-tight seal. As used herein, "at least one" refers to more than one instances of the specified component. As such, alternate embodiments of the present invention may utilize a first hatch 18 and a second hatch 19 secured by a corresponding first hatch cover 20 and a second hatch cover 21.

Preferably, the plurality of mounting brackets 3 is used to position the center of gravity of the UAV directly over the center of buoyancy of the flotation device 1. As such, the plurality of mounting brackets 3 is laterally attached onto the exposed side 13 of the flotation device 1. The plurality of mounting brackets 3 is equipped with a snap locking mechanism that connects to the flotation device 1. As mentioned, the UAV has downward pointing sensors that monitor the ground or the surface of the water to help the UAV navigate and land. The sensors must be given an unimpeded view of the water surface so that the UAV can navigate properly. Accordingly, the plurality of mounting brackets 3 is positioned along the perimeter of the flotation device 1. This positions the plurality of mounting brackets 3 away from the underbody of the UAV which contains the sensors. In the preferred embodiment, each of the plurality of mounting brackets 3 comprises a clamp that fastens onto a rotor arm of the UAV. A quick-release snap secures the clamp onto the rotor arm, thereby preventing the rotor arm from separating from the corresponding mounting bracket. Generally, each rotor arm is attached to a single mounting bracket. As such, depending on the number of rotors on the UAV, the number of mounting brackets 3 may change. Further, the plurality of mounting brackets 3 is custom built for each specific UAV model. This is so that the center of gravity can always be aligned to the center of buoyancy of the flotation device 1.

Once mounted, the camera of the UAV is positioned pointing downwards into the into the underwater scope 4. The underwater scope 4 traverses through the flotation device 1 from the exposed side 13 and out of the submerged side 12. This allows the camera to examine the underwater environment. The preferred underwater scope 4 is generally conical in shape and tapers in the vertical direction. The camera is positioned over the tapered end of the underwater scope 4, with the wide end of the underwater scope 4 being submerged below the waterline. The underwater illumination light 9 is mounted adjacent to the underwater scope 4. In one embodiment, the underwater illumination light 9 may be mounted via an arm that extends in front of the flotation device 1. Further, the underwater illumination light 9 may be a flash light with a protective plastic enclosure. A clip mounted laterally onto the protective enclosure may engage the arm. Alternately, any mounting mechanism known in the relevant arts may be utilized.

Figure 4:
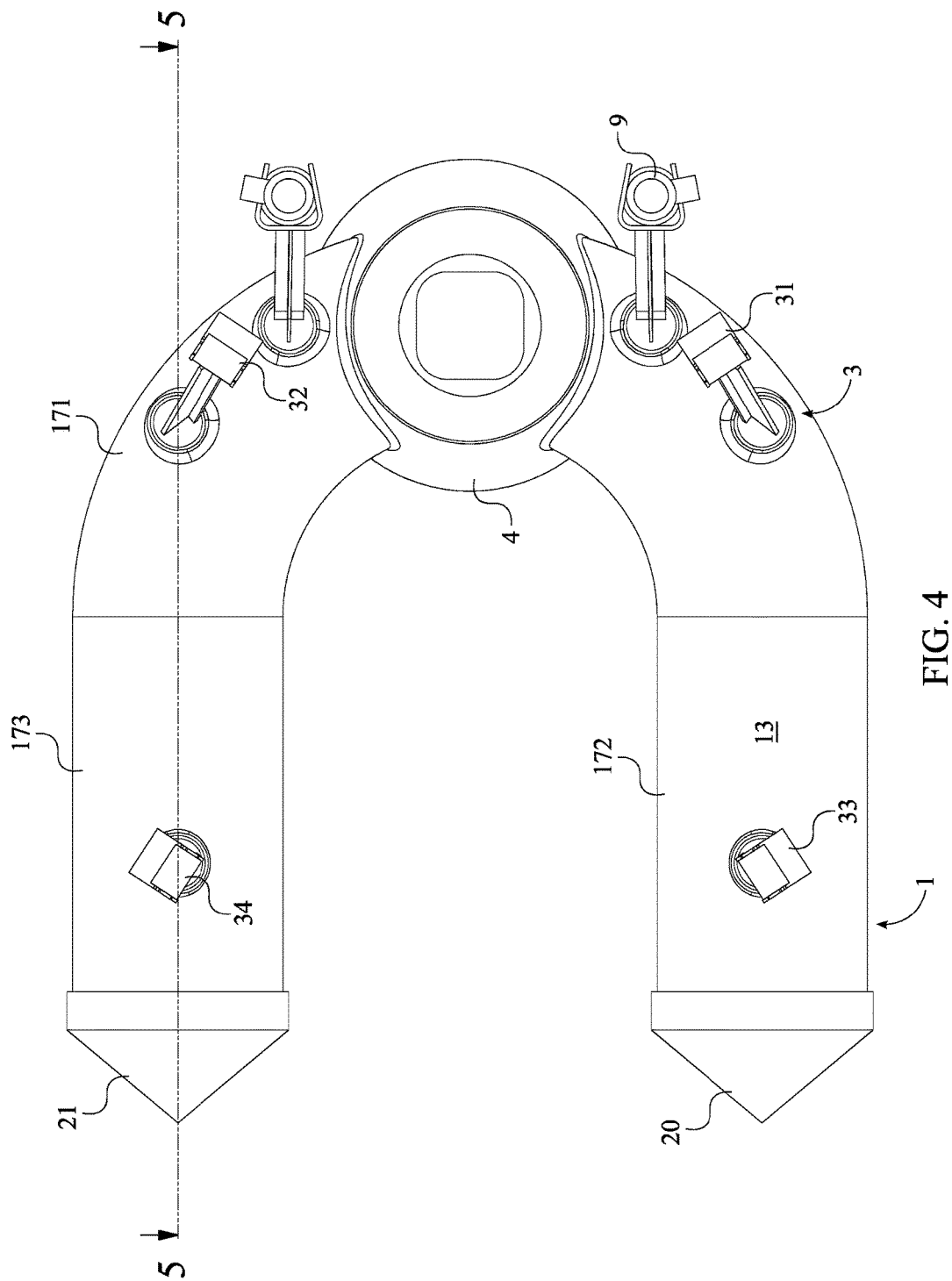
FIG. 4 is a top view illustrating the orientation of the curved tube to the first parallel tube and the second parallel tube.
Figure 5:
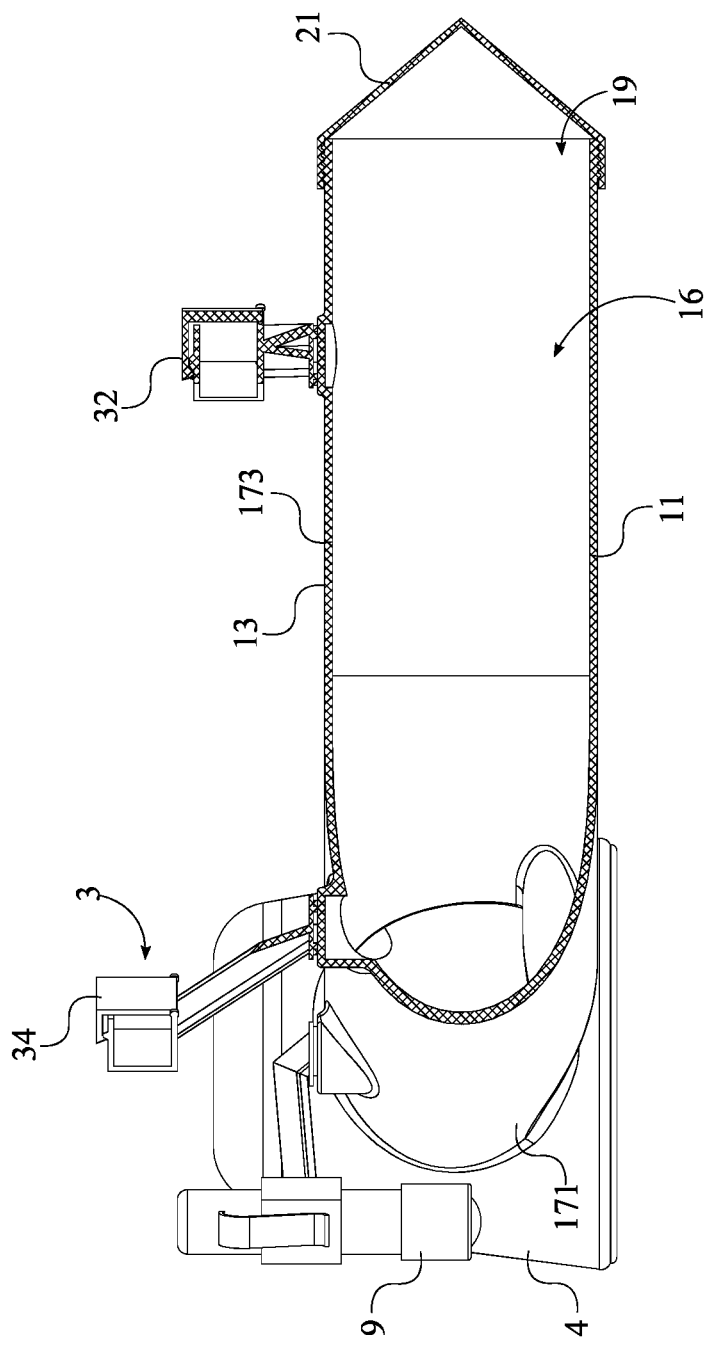
FIG. 5 is a cross section view taken along line 5-5 in FIG. 4 illustrating the storage compartment in the flotation device.

Referring to FIG. 4 and FIG. 5, in one possible embodiment, the flotation device 1 comprises a first parallel tube 172, a second parallel tube 173, and a curved tube 171. The first parallel tube 172, the second parallel tube 173, and the curved tube 171 are configured into a U-shaped tube. The first parallel tube 172 and the second parallel tube 173 are cylindrical tubes that are positioned parallel to each other. The first parallel tube 172 and the second parallel tube 173 are connected by the curved tube 171. Accordingly, the first parallel tube 172 is connected adjacent to the curved tube 171. Similarly, the second parallel tube 173 is connected adjacent to the curved tube 171, opposite the first parallel tube 172.

Figure 6:
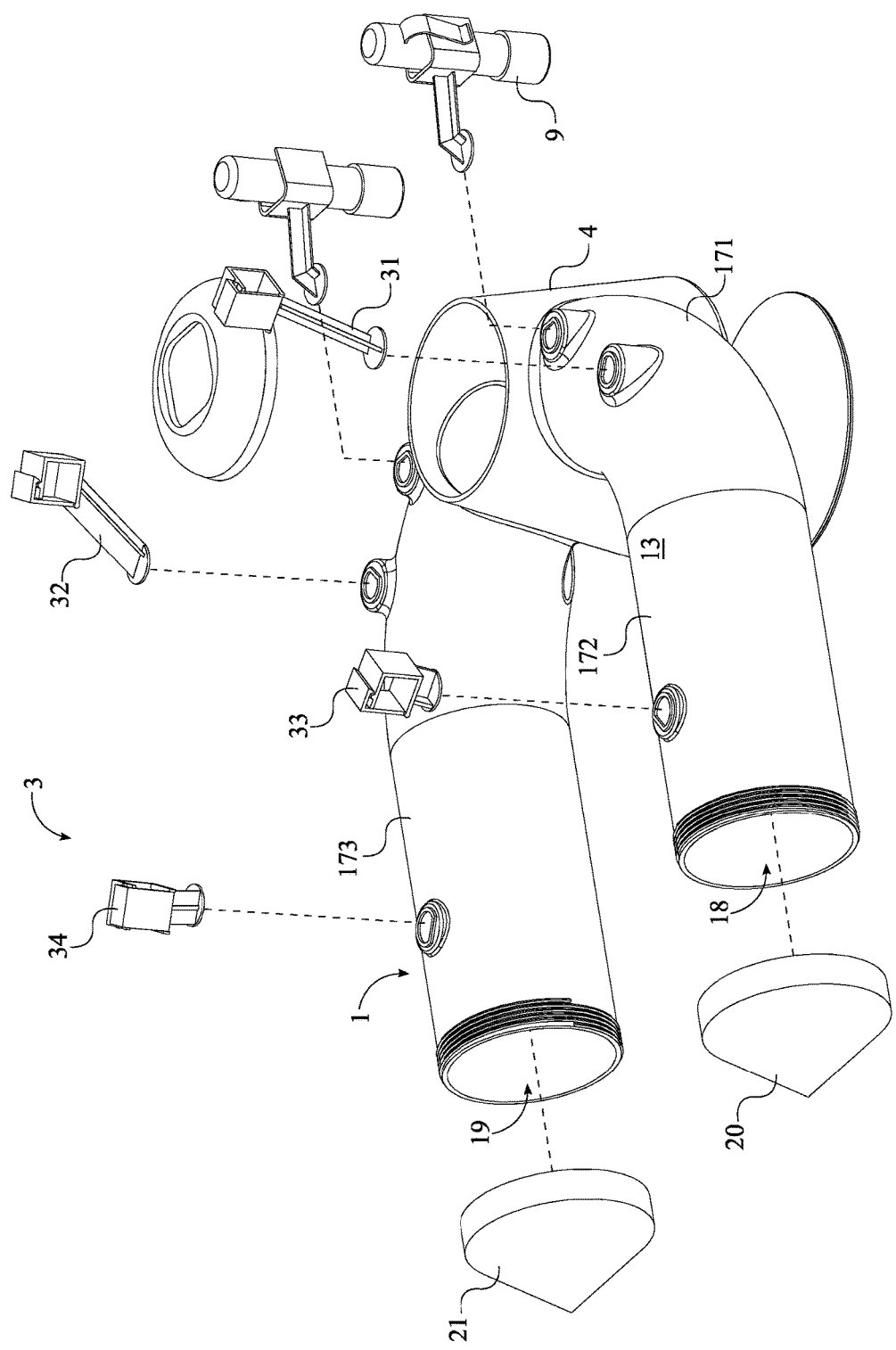
FIG. 6 is an exploded rear perspective view illustrating the position of the first front mounting bracket and the first rear mounting bracket.

As can be seen in FIG. 5 and FIG. 6, in this embodiment, the storage compartment 16 is the space enclosed by the first parallel tube 172, the second parallel tube 173, and the curved tube 171. To allow access to the storage compartment 16, the at least one hatch cover 15 comprises the first hatch cover 20. Consequently, the at least one hatch 14 comprises the first hatch 18. As the name implies, the first hatch 18 traverses terminally into the first parallel tube 172. Accordingly, the first hatch cover 20 is attached to the first parallel tube 172, wherein the first hatch cover 20 selectively encloses the first hatch 18. To allow access to the second parallel tube 173, the at least one hatch cover 15 comprises the second hatch 19. Likewise, the at least one hatch 14 comprises the second hatch 19. The second hatch 19 traverses terminally into the second parallel tube 173. Accordingly, the second hatch cover 21 is attached to the second parallel tube 173, wherein the second hatch cover 21 selectively encloses the second hatch 19. Preferably, both the first hatch cover 20 and the second hatch cover 21 are screw caps that easily attach and detach from the first hatch 18 and the second hatch 19 respectively. Accordingly, the first hatch 18 and second hatch 19 are circular threaded openings.

Referring to FIG. 6, further, in this embodiment, the main body of the UAV is positioned coextensive to the flotation device 1. Thus, the flotation device 1 shares the boundaries of the main body. Most UAVs have the camera mounted close to the front of the main body. Thus, underwater scope 4 is also mounted on the front of the flotation device 1. In this embodiment, the front corresponds to the outer edge of the curved tube 171. Accordingly, the underwater scope 4 traverses through the curved tube 171. Further, the underwater scope 4 is positioned between the first parallel tube 172 and the second parallel tube 173. This positions the underwater scope 4 close to the camera of the UAV.

In this embodiment, the plurality of mounting brackets 3 comprises a first front mounting bracket 31, a first rear mounting bracket 33, a second front mounting bracket 32, and a second rear mounting bracket 34. The first front mounting bracket 31 and the first rear mounting bracket 33 are attached to the first parallel tube 172 of the flotation device 1. More specifically, the first front mounting bracket 31 and the first rear mounting bracket 33 are positioned opposite each other about the first parallel tube 172. Similarly, the second front mounting bracket 32 and the second rear mounting bracket 34 are positioned opposite each other about the second parallel tube 173. As the names imply, the first front mounting bracket 31 and the second front mounting bracket 32 are designed to mount onto the front rotor arms of the UAV. In the preferred embodiment, the UAV is the DJI Mavic Pro 2 which is configured with the front pair of rotor arms vertically offset from the rear pair of rotor arms. Accordingly, the first front mounting bracket 31 and the second front mounting bracket 32 are longer than the first rear mounting bracket 33 and the second rear mounting bracket 34. In alternate embodiment of the present invention, depending on the specific model of the UAV, the length of the plurality of mounting brackets 3 may change.

Figure 7:
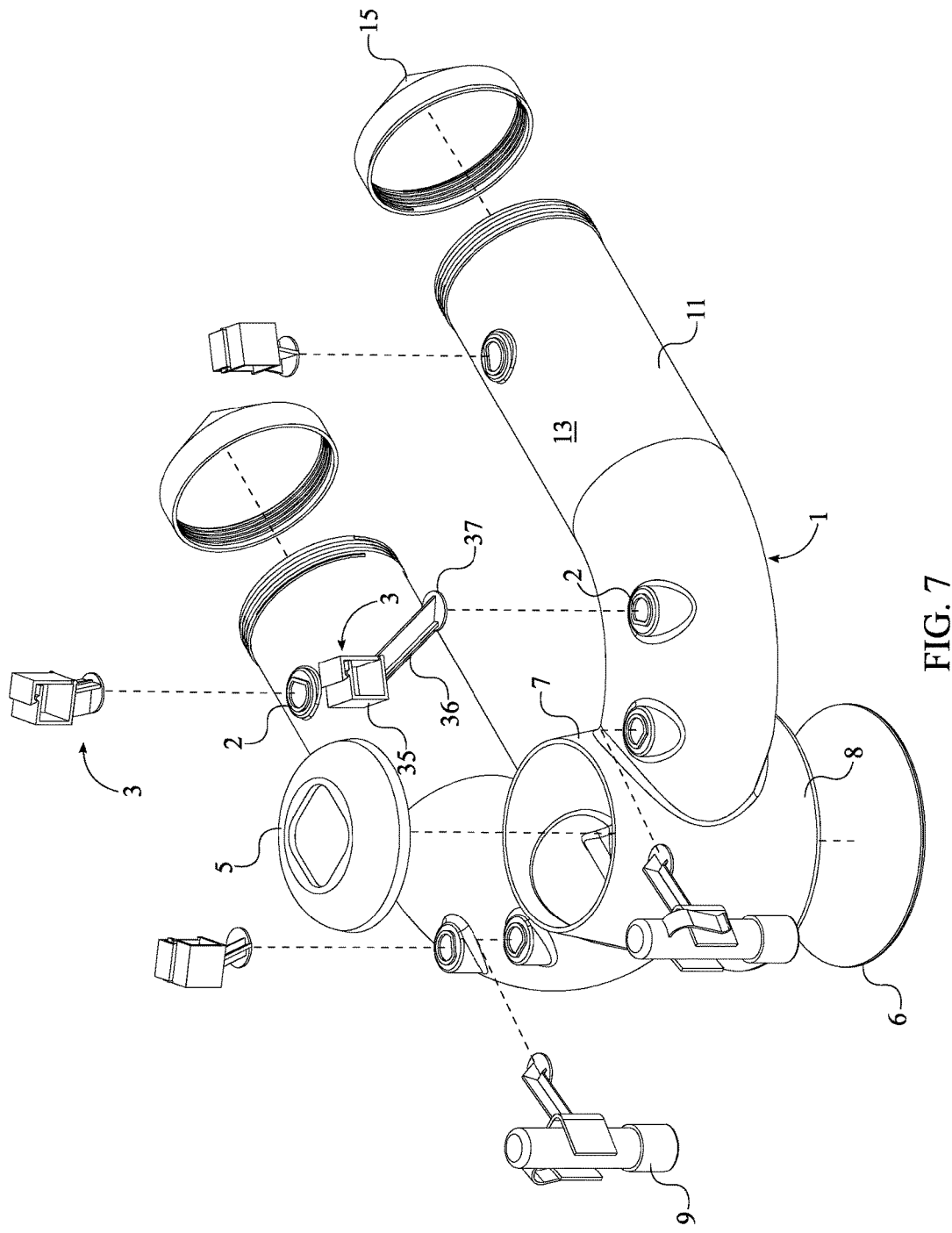
FIG. 7 is an exploded front perspective view illustrating the connection between the male snap of the mounting bracket and the female snap of the flotation device.

Referring to FIG. 7, in one possible embodiment of the present invention, each of the plurality of mounting brackets 3 comprises a frame connector 35, a support arm 36, and a male snap 37. The preferred frame connector 35 comprises a C-clamp that snaps onto a proximal rotor arm. This securely fastens each of the mounting brackets 3 to the proximal rotor arm. To detach each of the mounting brackets 3, the snap must be disengaged, and the frame connector 35 detached from the proximal rotor arm. The frame connector 35 is mounted to the flotation device 1 via the support arm 36. As such, the frame connector 35 is terminally connected onto the support arm 36. The preferred support arm 36 is a thin sheet of plastic extending obliquely from the flotation device 1. By making the support arm 36 oblique, the center of gravity of the UAV is positioned in-line with the center of buoyancy of the floatation device. However, the position of the center of gravity can change between different models of UAVs. As such, the oblique angle between the support arm 36 and the flotation device 1 can also change between embodiments. This allows the UAV to be shifted forwards or backwards, thereby aligning the center of gravity to the center of buoyancy. This also allows the different models of UAVs to successfully be mounted onto the flotation device 1.

In this embodiment, the plurality of mounting brackets 3 is snapped onto the exposed side 13. More specifically, the male snap 37 allows each of the mounting brackets 3 to snap onto the exposed surface of the flotation device 1. Accordingly, the male snap 37 is terminally connected onto the support arm 36, opposite the frame connector 35. Further, the flotation device 1 comprises a plurality of female snaps 2. The plurality of female snaps 2 is laterally connected onto the exposed side 13. As such, the male snap 37 of each of the plurality of mounting brackets 3 is attached to an adjoining female snap 37. The male snap 37 can also be easily detached from the adjoining female snap 37. This allows the present invention to be rapidly disassembled and re-assembled as required. For example, the present invention may be disassembled for storage in a car during transportation. Once at the desired location, the present invention may be easily re-assembled thanks to the snap locking design of the plurality of mounting brackets 3. In an alternate embodiment, the plurality of mounting brackets 3 may utilize screws, adhesives, magnets, and/or similar fastening mechanism to engage to the flotation device 1.

In yet another embodiment, the plurality of mounting brackets 3 comprises a twisting mechanism between the support arm 36 and the male snap 37. The twisting mechanism allows the support arm 36 and the attached frame connector 35 to rotate in relation to the flotation device 1. Accordingly, the first front mounting bracket 31 and the second frame mounting bracket 33 may be switched with the first rear mounting bracket 32 and the second rear mounting bracket 34. This allows the UAV to be mounted backwards on the flotation device 1.

Figure 8:
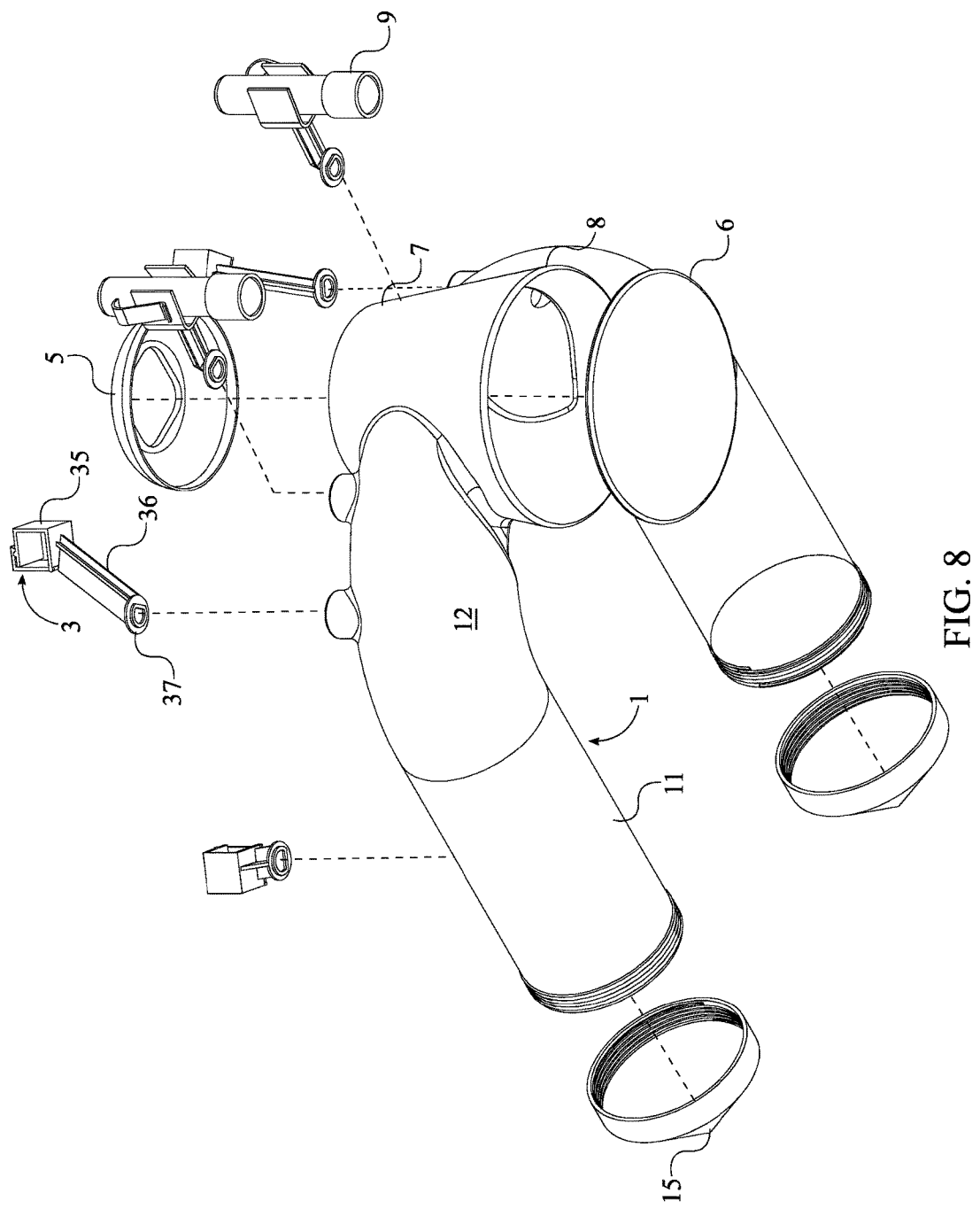
FIG. 8 is an exploded bottom perspective view illustrating the submerged portion positioned offset from the submerged side.

As can be seen in FIG. 7 and FIG. 8, the preferred embodiment of the underwater scope 4 is equipped with an eyepiece 5 which engages the camera of the UAV. Further, a lens 6 is provided to display a clear image of the underwater environment. Accordingly, the underwater scope 4 comprises an exposed portion 7 and a submerged portion 8. As the name implies, the exposed portion 7 is exposed above the waterline whereas the submerged portion 8 is immersed in water. As such, this allows the camera of the UAV to be mounted onto the exposed portion 7. Accordingly, the exposed portion 7 is laterally positioned onto the exposed side 13 of the flotation device 1. Similarly, the submerged portion 8 is laterally positioned onto the submerged side 12. This places the submerged portion 8 below the water line and gives the camera a clear view of the underwater environment. The eyepiece 5 is terminally connected onto the submerged portion 8, opposite the submerged side 12.

In the preferred implementation, the eyepiece 5 blocks out external light so that the camera can get an unobstructed view of the underwater environment. Preferably, the eyepiece 5 is a plastic cap with a hole for inserting the camera of the UAV. The plastic cap is fashioned with threads to allow the eyepiece 5 to screw onto the exposed portion 7. This allows the eyepiece 5 to be interchanged depending on the specific model of the UAV. For example, if the UAV is positioned closer to the front of the flotation device 1, the hole is also positioned closer to the front of the screw cap. Alternately, if the UAV is positioned towards the rear of the flotation device 1, the hole is also positioned towards the rear of the screw cap. This allows the eyepiece 5 to successfully cover the camera of the UAV. Finally, the lens 6 is terminally connected onto the submerged portion 8, opposite the submerged side 12. More specifically, the lens 6 is screwed onto the exposed portion 7. In one possible embodiment of the present invention, the lens 6 may be a rectilinear lens 6 that acts as a pinhole which simply blocks most of the light rays. Alternately, the lens 6 may be a convex lens 6 that brings images to greater focus. In yet another embodiment, the lens 6 may be a part of a compound lens mounted inside the underwater scope 4 that allows for greater focus of the image. In each said embodiment, the lens 6 is terminally connected to the submerged portion 8.

Figure 9:
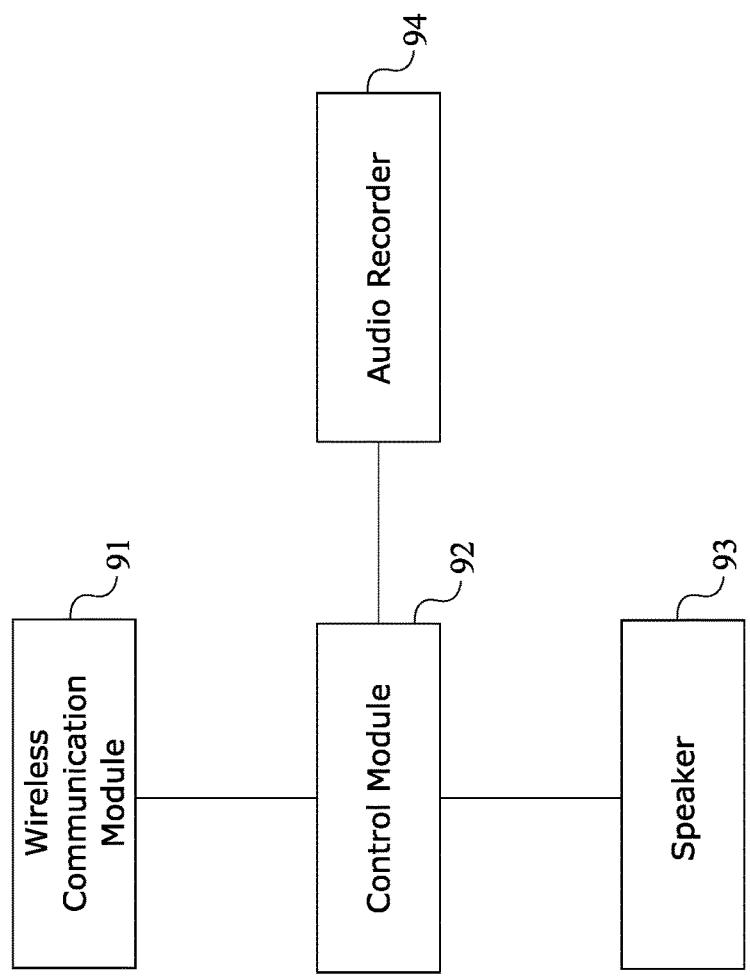
FIG. 9 is a schematic diagram illustrating the electronic connections of the present invention.

Referring to FIG. 1 and FIG. 9, the preferred embodiment of the present invention also comprises a control module 92, a speaker 93, an audio recorder 94, and a wireless communication module 91. The preferred wireless communication module 91 may utilize a wireless local area network (WLAN) transceiver, a short-range radio frequency (RF) transceiver, a near field communication (NFC) transceiver, and/or cellular transceiver to allow a user to remotely communicate with the control module 92. The control module 92 is a programmable integrated circuit (IC) designed to control the electronic devices of the present invention. As such, the control module 92 is electronically connected to the speaker 93 and the audio recorder 94. In one possible embodiment, the wireless communication module 91 and the control module 92 may be part of a mobile phone integrated into the flotation device 1. In this embodiment, the speaker 93 and the audio recorder 94 may be housed in the first parallel tube 172 and the second parallel tube 173. For example, the speaker 93 may be screwed onto the first parallel tube 172 and the audio recorder 94 may be screwed onto the second parallel tube 173. As such, the speaker 93 may output sound unimpeded from one side of the flotation device 1, whereas the audio recorder 94 may record sound from the opposite side of the flotation device 1.

Figure 10:
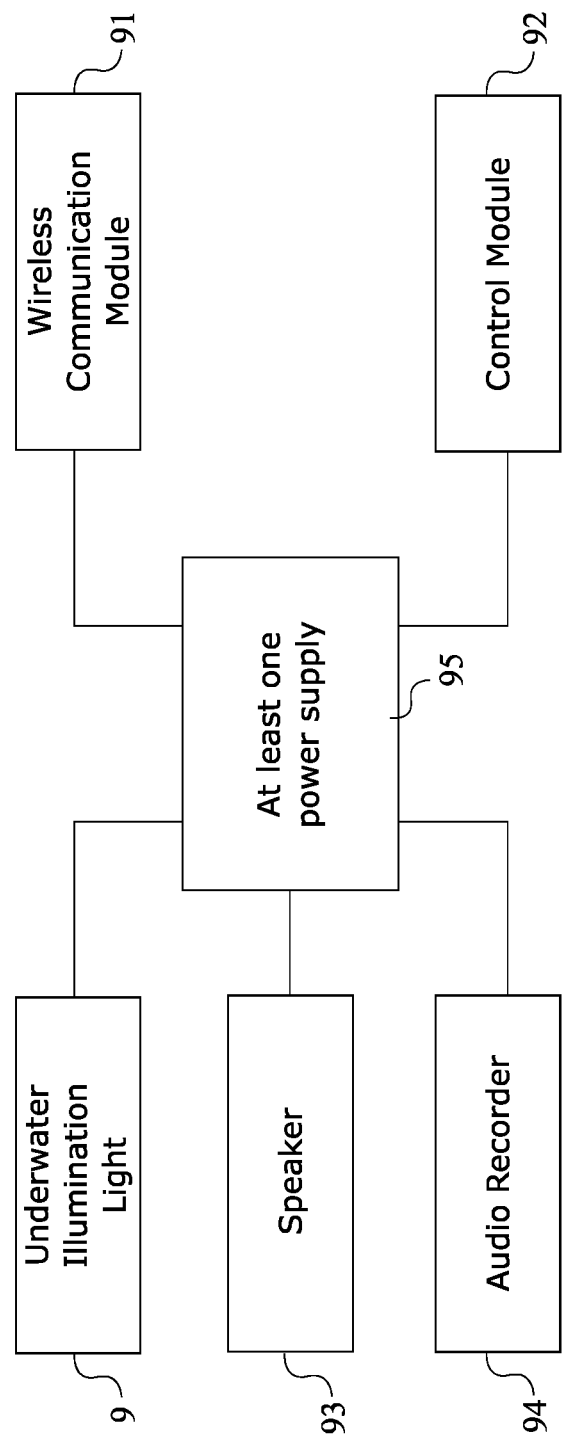
FIG. 10 is a schematic diagram illustrating the electric connections of the present invention.

Referring to FIG. 1 and FIG. 10, in this embodiment, the at least one power supply 95 provides power to the electric components of the present invention. Preferably, the at least one power supply 95 may be a rechargeable battery of a smartphone. As such, the at least one power supply 95 may be wired to the speaker 93 and the audio recorder 94. Accordingly, the at least one power supply 95 is electrically connected to the at least one underwater illumination light 9, the wireless communication module 91, the control module 92, the speaker 93, and the audio recorder 94. In alternate embodiments, each electric component of the present invention may be powered by a dedicated power supply. For example, the underwater illumination light 9, the speaker 93, and the audio recorder 94, may house a battery which provides the necessary power.

Although the invention has been explained in relation to its preferred embodiment, it is to be understood that many other possible modifications and variations can be made without departing from the spirit and scope of the invention as hereinafter claimed.

What is claimed is:

1. A retrofittable float with an underwater camera attachment for unmanned aerial vehicles comprises:
    a flotation device;
    a plurality of mounting brackets;
    an underwater scope;
    at least one underwater illumination light;
    the flotation device comprises an outer shell, a submerged side, an exposed side, at least one hatch, at least one hatch cover, and a storage compartment;
    the submerged side and the exposed side being positioned opposite each other about the outer shell;
    the storage compartment being positioned within the outer shell;
    the at least one hatch traversing through the outer shell delineating the storage compartment;
    the at least one hatch cover being attached to the outer shell, wherein the at least one hatch cover selectively encloses the at least one hatch;
    the plurality of mounting brackets being laterally attached onto the exposed side of the flotation device;
    the plurality of mounting brackets being positioned along the perimeter of the flotation device;
    the underwater scope traversing through the flotation device from the exposed side and out of the submerged side; and
    the at least one underwater illumination light being mounted adjacent to the underwater scope.

2. The retrofittable float with an underwater camera attachment for unmanned aerial vehicles as claimed in claim 1 comprises:
    a control module;
    a speaker;
    an audio recorder;
    a wireless communication module; and
    the control module being electronically connected to the wireless communication module, the speaker, and the audio recorder.

3. The retrofittable float with an underwater camera attachment for unmanned aerial vehicles as claimed in claim 2 comprises:
    at least one power supply; and
    the at least one power supply being electrically connected to the at least one underwater illumination light, wireless communication module, the control module, the speaker, and the audio recorder.

4. The retrofittable float with an underwater camera attachment for unmanned aerial vehicles as claimed in claim 1 comprises:
    the flotation device comprises a first parallel tube, a second parallel tube, and a curved tube;
    the first parallel tube being connected adjacent to the curved tube; and
    the second parallel tube being connected adjacent to the curved tube, opposite the first parallel tube.

5. The retrofittable float with an underwater camera attachment for unmanned aerial vehicles as claimed in claim 4 comprises:
    the underwater scope traversing through the curved tube; and
    the underwater scope being positioned between the first parallel tube and the second parallel tube.

6. The retrofittable float with an underwater camera attachment for unmanned aerial vehicles as claimed in claim 4 comprises:
    the at least one hatch cover comprises a first hatch cover;
    the at least one hatch comprises a first hatch;
    the first hatch traversing terminally into the first parallel tube; and
    the first hatch cover being attached to the first parallel tube, wherein the first hatch cover selectively encloses the first hatch.

7. The retrofittable float with an underwater camera attachment for unmanned aerial vehicles as claimed in claim 4 comprises:
    the at least one hatch cover comprises a second hatch cover;
    the at least one hatch comprises a second hatch;
    the second hatch traversing terminally into the second parallel tube; and
    the second hatch cover being attached to the second parallel tube, wherein the second hatch cover selectively encloses the second hatch.

8. The retrofittable float with an underwater camera attachment for unmanned aerial vehicles as claimed in claim 1 comprises:
    the plurality of mounting brackets comprises a first front mounting bracket, a first rear mounting bracket, a second front mounting bracket, and a second rear mounting bracket;
    the flotation device comprises a first parallel tube and a second parallel tube;
    the first front mounting bracket and the first rear mounting bracket being positioned opposite each other about the first parallel tube; and
    the second front mounting bracket and the second rear mounting bracket being positioned opposite each other about the second parallel tube.

9. The retrofittable float with an underwater camera attachment for unmanned aerial vehicles as claimed in claim 1 comprises:
    each of the plurality of mounting brackets comprises a frame connector, a support arm, and a male snap;
    the frame connecter being terminally connected onto the support arm; and the male snap being terminally connected onto the support arm, opposite the frame connector.

10. The retrofittable float with an underwater camera attachment for unmanned aerial vehicles as claimed in claim 9 comprises:
the flotation device comprises a plurality of female snaps;
the plurality of female snaps being laterally connected onto the exposed side; and
the male snap of each of the plurality of mounting brackets being attached to an adjoining female snap.

11. The retrofittable float with an underwater camera attachment for unmanned aerial vehicles as claimed in claim 1 comprises:
an eyepiece;
a lens;
the underwater scope comprises an exposed portion and a submerged portion;
the exposed portion being laterally positioned onto the exposed side of the flotation device;
the submerged portion being laterally positioned onto the submerged side;
the eyepiece being terminally connected onto the exposed portion, opposite the exposed side; and
the lens being terminally connected onto the submerged portion, opposite the submerged side.

* * * * *